United States Patent
Nagaoka et al.

(10) Patent No.: US 8,058,205 B2
(45) Date of Patent: Nov. 15, 2011

(54) NITROGEN OXIDE PURIFICATION SYSTEM

(75) Inventors: Daiji Nagaoka, Fujisawa (JP); Masashi Gabe, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 997 days.

(21) Appl. No.: 11/666,277

(22) PCT Filed: Nov. 10, 2005

(86) PCT No.: PCT/JP2005/020579
§ 371 (c)(1),
(2), (4) Date: Apr. 25, 2007

(87) PCT Pub. No.: WO2006/059471
PCT Pub. Date: Jun. 8, 2006

(65) Prior Publication Data
US 2008/0120971 A1    May 29, 2008

(30) Foreign Application Priority Data
Nov. 30, 2004    (JP) ................. 2004-345785

(51) Int. Cl.
*B01J 23/00* (2006.01)
*B01J 21/00* (2006.01)
*B01J 20/00* (2006.01)
*B01D 50/00* (2006.01)

(52) U.S. Cl. ........ 502/330; 502/304; 502/326; 502/327; 502/328; 502/332; 502/333; 502/334; 502/339; 422/170; 422/171; 422/177; 422/180

(58) Field of Classification Search .............. 502/304, 502/327, 330, 332, 333, 334, 339, 326, 328; 422/170, 171, 177, 180
See application file for complete search history.

(56) References Cited

U.S. PATENT DOCUMENTS

| | | | | |
|---|---|---|---|---|
| 5,741,468 | A | * | 4/1998 | Saito et al. .............. 423/239.1 |
| 5,750,082 | A | * | 5/1998 | Hepburn et al. .......... 423/213.5 |
| 5,753,192 | A | * | 5/1998 | Dobson et al. .............. 422/177 |
| 6,217,831 | B1 | * | 4/2001 | Suzuki et al. ............... 422/177 |
| 6,375,910 | B1 | * | 4/2002 | Deeba et al. ............. 423/239.1 |
| 6,391,822 | B1 | | 5/2002 | Dou et al. |
| 6,395,675 | B1 | * | 5/2002 | Suga et al. .................. 502/326 |

(Continued)

FOREIGN PATENT DOCUMENTS
EP    0 716 876    6/1996
(Continued)

OTHER PUBLICATIONS

English language International Search Report in International Application No. PCT/JP2005/020579.

(Continued)

*Primary Examiner* — Cam N. Nguyen
(74) *Attorney, Agent, or Firm* — Staas & Halsey LLP

(57) ABSTRACT

An NOx purification system having NOx occlusion reduction-type catalysts including an occlusion material and a metal catalyst, which occludes NOx in a lean state in terms of a fuel-air ratio of an exhaust gas and releases the occluded NOx in a rich state. A high-temperature type catalyst is placed on the upstream side, and a low-temperature type catalyst is disposed on the downstream side in series with the high-temperature type catalyst. The molar ratio of platinum to rhodium supported on the high-temperature type catalyst is within a range of 2:1 to 1:2. This NOx purification system is capable of a wide NOx activation temperature window.

24 Claims, 7 Drawing Sheets

U.S. PATENT DOCUMENTS

| | | | |
|---|---|---|---|
| 6,413,904 B1 * | 7/2002 | Strehlau et al. | 502/328 |
| 6,497,848 B1 * | 12/2002 | Deeba et al. | 422/180 |
| 6,514,905 B1 * | 2/2003 | Hanaki et al. | 502/328 |
| 6,562,753 B2 * | 5/2003 | Miyoshi et al. | 502/325 |
| 6,777,370 B2 * | 8/2004 | Chen | 502/241 |
| 6,841,511 B2 * | 1/2005 | Kaneeda et al. | 502/330 |
| 6,852,666 B1 * | 2/2005 | Bouly et al. | 502/304 |
| 6,866,834 B2 * | 3/2005 | Nakamura et al. | 423/239.1 |
| 6,953,769 B2 * | 10/2005 | Yamada et al. | 502/302 |
| 7,022,646 B2 * | 4/2006 | Li | 502/339 |
| 7,071,141 B2 * | 7/2006 | Gandhi et al. | 502/302 |
| 7,094,730 B2 * | 8/2006 | LaBarge et al. | 502/332 |
| 7,150,861 B2 * | 12/2006 | Morita et al. | 423/213.5 |
| 7,169,734 B2 * | 1/2007 | Nakamura et al. | 502/302 |
| 7,276,212 B2 * | 10/2007 | Hu et al. | 422/177 |
| 7,287,370 B2 * | 10/2007 | Rajaram et al. | 60/274 |
| 7,329,629 B2 * | 2/2008 | Gandhi et al. | 502/325 |
| 7,870,724 B2 * | 1/2011 | Ura et al. | 60/299 |
| 2004/0077495 A1 * | 4/2004 | Hara et al. | 502/325 |
| 2004/0082469 A1 * | 4/2004 | Gandhi et al. | 502/305 |
| 2004/0082470 A1 * | 4/2004 | Gandhi et al. | 502/325 |
| 2004/0115104 A1 * | 6/2004 | Iizuka et al. | 422/177 |
| 2005/0164879 A1 * | 7/2005 | Chen | 502/328 |

FOREIGN PATENT DOCUMENTS

| | | |
|---|---|---|
| JP | 10-47042 | 2/1998 |
| JP | 10-205326 | 8/1998 |
| JP | 2000-126554 | 5/2000 |
| JP | 2000-167356 | 6/2000 |
| JP | 2003-38936 | 2/2003 |
| JP | 2003-245523 | 9/2003 |
| JP | 2004-148190 | 5/2004 |
| JP | 2004-230241 | 8/2004 |
| WO | 00/59611 | 10/2000 |
| WO | 02/40139 | 5/2002 |

OTHER PUBLICATIONS

European Search Report for corresponding European Patent Application 05805959.3-1213 mailed on Feb. 27, 2008.

Patent Abstracts of Japan, Publication No. 10-047042, Published Feb. 17, 1998.

Patent Abstracts of Japan, Publication No. 10-205326, Published Aug. 4, 1998.

* cited by examiner

NITROGEN OXIDE PURIFICATION SYSTEM

CROSS REFERENCE TO RELATED APPLICATIONS

This application is based on PCT Application No. PCT/JP2005/020579, filed on Nov. 10, 2005 and Japanese Application No. 2004-345785, filed on Nov. 30, 2004, the disclosures of which are hereby incorporated herein by reference.

FIELD OF THE INVENTION

The present invention relates to the composition and layout of nitrogen oxide (NOx) purification catalysts used in an exhaust gas post-processing unit and in particular a NOx purification system with the composition and layout where catalysts increase the NOx purification rate at a low temperature, thus enabling it to attain a high NOx purification rate throughout a wide temperature range.

DESCRIPTION OF THE RELATED ART

Various research and proposals have been made regarding NOx catalysts for reducing and removing NOx in exhaust gas from internal combustion engines such as diesel engines and certain types of gasoline engines and other various types of combustion units. One such catalyst is a NOx occlusion reduction type catalyst, which is the catalyst used in lowering NOx from diesel engines. By using this catalyst, NOx in exhaust gas can be effectively purified.

The NOx occlusion reduction type catalyst is basically a catalyst in which the metal catalyst that accelerates the oxidation/reduction reaction and a NOx occlusion material (NOx occlusion substance) that occludes and releases NOx are carried by a catalyst carrier such as alumina. The metal catalyst is usually made of precious metals such as platinum (Pt), rhodium (Rh), and palladium (Pd). The NOx occlusion material is made of an alkaline earth metal such as barium (Ba) or an alkaline metal such as potassium (K).

With the NOx occlusion reduction type catalyst, if the air/fuel ratio of inflowing exhaust gas is in a lean (excessive oxygen) state and there is oxygen ($O_2$) in the atmosphere, the nitrogen monoxide (NO) in the exhaust gas is oxidized by a metal catalyst into nitrogen dioxide ($NO_2$). The $NO_2$ is accumulated in a NOx occlusion material as nitrate salt (such as $Ba_2NO_4$) or the like.

If the air/fuel ratio of inflowing exhaust gas is a theoretical air/fuel ratio or is in a rich (low oxygen concentration) state and oxygen concentration is low in the atmosphere, the NOx occlusion material such as Ba bonds to carbon monoxide (CO) and nitrate salt decomposes and $NO_2$ is released. The released $NO_2$ is then reduced by unburned hydrocarbon (HC), CO, and the like contained in the exhaust gas through the three-fold function of precious metals to become nitrogen ($N_2$). Thus, components contained in exhaust gas are released into the atmosphere as non-hazardous substances such as carbon dioxide ($CO_2$), water ($H_2O$), and nitrogen.

Therefore, in an exhaust gas purification system with a NOx occlusion reduction type catalyst, when the NOx occlusion capacity nears saturation, the NOx regeneration operation that performs the richness control for restoring the NOx occlusion capacity is carried out. This richness control enriches the air/fuel ratio of the exhaust gas, thus lowering the oxygen concentration of the inflowing exhaust gas. The richness control enables the absorbed NOx to be released and the released NOx to be reduced by a precious metal catalyst.

The NOx occlusion reduction type catalyst can be divided into two types depending on the composition of the catalyst: a low-temperature type NOx occlusion reduction type catalyst whose activity at low temperature is high and a high-temperature type NOx occlusion reduction type catalyst whose activity at high temperature is high. As shown in FIG. 4, the low-temperature type NOx occlusion reduction type catalyst employs a NOx occlusion material mainly made of an alkaline earth metal such as barium (Ba) that does not inhibit the activity of the precious metal. Therefore, the activity of the precious metal is not inhibited and the NOx reduction performance at low temperature is excellent. The use of alkaline earth metal, however, creates a problem in that NOx occlusion capacity may decrease at high temperature.

Meanwhile, as shown in FIG. 4, the high-temperature type occlusion reduction type catalyst employs an alkaline metal such as potassium (K) as its occlusion material, which has the opposing property to that of the alkaline earth metal. The alkaline metal has high NOx occlusion capacity at high temperature. However, since the alkaline metal inhibits the activity of the precious metal (oxidation catalyst) at low temperature, there is a problem in that NOx reduction performance may deteriorate within a low-temperature range.

To solve these problems and cope with various exhaust gas regulations, a wider temperature window is necessary. As shown in FIG. 4, for example, in JE 05 mode, the lowest catalyst bed temperature is approximately 100 deg C. In the D13 mode, that is the strictest, the catalyst bed temperature is 530 deg C. in the 11 mode. In the United States, a full load point is also included in the exhaust gas mode and the catalyst bed temperature can reach approximately as high as 600 deg C. In such circumstances, however, there is a problem in that existing low-temperature type NOx occlusion reduction type catalysts can only cover a range of 150 deg C. to 400 deg C. and that existing high-temperature type NOx occlusion reduction type catalysts can only cover a range of 300 deg C. to 650 deg C.

In an attempt to widen the temperature window of NOx occlusion reduction catalysts, for example, as described in Japanese patent application Kokai publication No. 1998-47042 and Japanese patent application Kokai publication No. 2000-167356, proposed is an exhaust gas purification system and apparatus. In this system, a high-temperature type NOx occlusion reduction type catalyst is disposed upstream while a low-temperature type NOx occlusion reduction type catalyst is disposed downstream in exhaust gas.

In addition, for example, as described in Japanese patent application Kokai publication No. 1998-205326, proposed is a catalyst unit for purifying exhaust gas from an internal combustion engine. In the catalyst unit, a plurality of catalysts that have different NOx activation temperature ranges are disposed adjacently in series. A higher catalyst volume is allocated to the catalyst that has higher NOx activation temperature range, and the catalyst that has higher NOx activation temperature range is disposed more on the upstream side.

In the NOx occlusion reduction type catalyst, there is another problem in that NOx purification rate may decrease due to heat deterioration (mainly sintering). As a result of aged deterioration (aging) testing using simulated gas, as indicated in FIG. 5 to 7, in the low-temperature type NOx occlusion reduction type catalyst, the decrease of NOx purification rate due to heat deterioration in a low-temperature range (in the vicinity of 200 deg C.) is minimal. However, the NOx purification rate in a high-temperature range (in the vicinity of 500 deg C.) gradually decreases.

It might be because, in the low-temperature range, the NOx purification rate is hardly subjected to the effect of the lowering of occlusion efficiency. This lower occlusion efficiency is caused by the lowering of activity of NO to $NO_2$ due to the deterioration of a precious metal since NOx adsorption performance is effectively utilized. In high-temperature type NOx occlusion reduction type catalyst, on the contrary, the decrease of NOx purification rate due to heat deterioration is minimal in a high-temperature range (in the vicinity of 500 deg C.) while the NOx purification rate in a low-temperature range (in the vicinity of 200 deg C.) rapidly decreases.

Considering such heat deterioration properties, a NOx purification system that is hardly subjected to the effect of heat deterioration from low to high temperatures, working as a unit in the whole system, is needed.

SUMMARY OF THE INVENTION

The present invention is made to solve the above-mentioned problems and the objective of the present invention is to provide a NOx purification system that employs NOx occlusion reduction type catalysts for purifying NOx in exhaust gas. It has a wide NOx activation temperature window because of how the composition and layout of the catalysts are devised.

A NOx purification system that meets the above-mentioned objective includes NOx occlusion reduction type catalysts having an occlusion material that occludes NOx if the air/fuel ratio in exhaust gas is in a lean state and releases the occluded NOx if the air/fuel ratio of exhaust gas is in a rich state and a metal catalyst. In the system, a high-temperature type NOx occlusion reduction type catalyst is disposed on the upstream side and a low-temperature type NOx occlusion reduction type catalyst is disposed on the downstream side in series and, platinum and rhodium are carried in the high-temperature type NOx occlusion reduction type catalyst and the molar ratio of the platinum carried thereon to the rhodium carried thereon is net within the range of 2:1 to 1:2.

In the present invention, the ratio of metal catalysts carried is changed in the high-temperature type NOx occlusion reduction type catalyst disposed in the front stage (on the upstream side). Specifically, a low-temperature type NOx occlusion reduction type catalyst increases the activity at low temperature by using only platinum (Pt), for example, as the metal catalyst. Conversely, the high-temperature type NOx occlusion reduction type catalyst increases the activity at high temperature by using an alkaline metal such as potassium (K) as the occlusion material. However, since the alkali metal suppresses the NOx purification activity of platinum, the amount of platinum carried is reduced and the amount of rhodium (Rh) carried is increased.

Furthermore, as to the ratio of platinum and rhodium carried, the amount of rhodium carried to the sum of the amounts of platinum and rhodium carried is set in the range of ⅓ to ⅔, i.e., in the range of Pt:Rh=2:1 to 1:2 (Pt/Rh=2 to 0.5). In the high-temperature type NOx occlusion reduction type catalyst, the range corresponds to area B where the NOx purification rate is high in FIG. 3. FIG. 3 shows data obtained by measuring NOx purification rate while the amount of rhodium carried is being changed.

The high-temperature type NOx occlusion reduction type catalyst is disposed in the front stage (on the upstream side) of the low-temperature type NOx occlusion reduction type catalyst. In this composition, partially-oxidized hydrocarbon (HC), whose main component is carbon monoxide (CO), can be generated even at very low temperature since rhodium has high hydrocarbon oxidation activity. The partially-oxidized hydrocarbon, whose main component is carbon monoxide, is an effective reducing agent for NOx purification, thus significantly improving the performance of the low-temperature type NOx occlusion reduction type catalyst in the rear stage, at very low temperature in the rear stage. This partial-oxide includes acid, ketone, and oxygen-containing hydrocarbon such as aldehyde in addition to carbon monoxide. The partially-oxidized hydrocarbon has higher reaction activity with NOx and more selectively reduces NOx, compared to hydrocarbon that is not oxidized.

Furthermore, in the above-described NOx purification system, the sum of the amount of platinum on the high-temperature-type NOx occlusion reduction type catalyst and the amount of rhodium carried thereon is set at not less than 0.5 g/L and not more than 5.0 g/L and the amount of platinum carried thereon is set at not less than 0.1 g/L and not more than 3.0 g/L.

If the sum of the amounts of platinum and rhodium carried is less than 0.5 g/L, purification activity is insufficient. If the sum is more than 5.0 g/L, purification activity effect is saturated, so it is not cost-effective. If the amount of platinum carried is less than 0.1 g/L, purification activity is insufficient. If the amount of platinum carried is more than 3.0 g/L, the alkaline metal suppresses the NOx purification activity of platinum, so it is not cost-effective.

In the above-mentioned NOx purification system, the NOx occlusion material is made of potassium. More amounts of NOx can be adsorbed by the occlusion material that has higher molecular weight per mole. In this case, however, since the weight is also heavier, the amount adsorbed is small per weight. Considering the balance of the amount adsorbed per mole and the amount adsorbed per weight, potassium is suitable since it has medium molecular weight compared to other alkaline metals. By using potassium, the NOx occlusion activity of the high-temperature type NOx occlusion reduction type catalyst at high temperature can be increased.

Furthermore, in the above-mentioned purification system, cerium is carried in the high-temperature type NOx occlusion reduction type catalyst, and the amount of the cerium carried is set at not less than 0.1 g/L and not more than 2.0 g/L. By carrying cerium (Ce) that absorbs and releases oxygen as an oxygen absorbent, the cerium supplies oxygen ($O_2$) in a rich state, accelerating partial-oxidization of a reducing agent, thus increasing the activity at low temperature. If the amount of cerium carried is less than 0.1 g/L, NOx occlusion and release effects are insufficient. If the amount of cerium carried is more than 2.0 g/L, NOx occlusion and release effects are not sufficient regardless of the sufficient amount, resulting in high cost.

These interaction effects enable the purification window regarding temperature range to be widened in a broad range from low temperature to high temperature, compared to the case where each catalyst is used separately. Therefore, the NOx purification system having a wide NOx activation window, which can be used for various test modes, can be provided.

According to the NOx purification system used in accordance with the present invention, in the high-temperature type NOx occlusion reduction type catalyst that increases the activity at high temperature by using an alkaline metal as the occlusion material, the amount of platinum carried whose NOx purification activity is suppressed by the alkaline metal is decreased, rhodium is carried, and the ratio between the amount of the platinum and the amount of the rhodium is set in the optimum range, thus enabling high NOx purification performance to be achieved.

In this high-temperature type NOx occlusion reduction type catalyst in the front stage, rhodium whose oxidation activity is high accelerates the activity in the oxidation reaction from nitrogen monoxide to nitrogen dioxide at low temperature, thus increasing NOx occlusion capacity. In addition, rhodium whose oxidation activity is high accelerates the partial-oxidization of hydrocarbon even at very low temperature. By the partial-oxide generated in this partial-oxidization, which is a good reducing agent for purifying NOx, the performance of the low-temperature type NOx occlusion reduction type catalyst in the rear stage can be significantly increased at very low temperature. Furthermore, the temperature elevation of exhaust gas in the high-temperature type NOx occlusion reduction catalyst in the front stage causes the temperature elevation of the low-temperature type NOx occlusion reduction type catalyst in the rear stage, thus improving NOx purification performance of the system.

Therefore, a NOx purification system that has a wide NOx activation temperature window from a low to a high-temperature range can be provided.

DESCRIPTION OF EMBODIMENTS

A NOx occlusion reduction type catalyst according to the present invention will hereinafter be described with reference to the drawings. The term "air/fuel ratio state of exhaust gas" herein used does not represent air/fuel ratio state in a cylinder, but represents the ratio between the amount of air and the amount of fuel (including the amount combusted in the cylinder) that are supplied into the exhaust gas flowing into the NOx occlusion reduction type catalyst.

Figure 1:
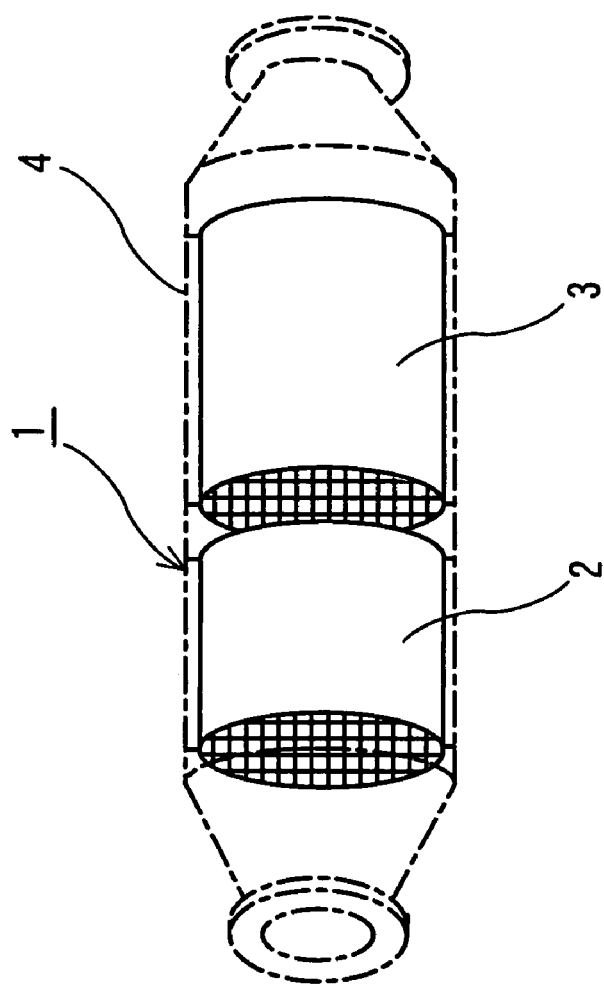
FIG. 1 illustrates the layout of a NOx purification system of an embodiment according to the present invention.

FIG. 1 illustrates the layout of a NOx occlusion reduction type catalyst 1 according to an embodiment of the present invention. The NOx occlusion reduction type catalyst 1 is composed of at least two types of catalysts: a high-temperature type NOx occlusion reduction type catalyst 2 (hereinafter referred as "high-temperature type catalyst") and a low-temperature type NOx occlusion reduction type catalyst (hereinafter referred as "low-temperature type catalyst") 3. In case 4, the high-temperature type catalyst 2 is disposed on the upstream side and the low-temperature type catalyst 3 is disposed on the downstream side in series. The high-temperature type catalyst 2 and the low temperature catalyst 3 may be abutted or may be disposed with some space between them. However, it is not recommended for the space to be too large because exhaust gas is cooled in this space. Therefore, it is preferable to provide a space to some degree for allowing equivalent inflow of exhaust gas to the low-temperature type catalyst 3.

The high-temperature type catalyst 2 is made of a monolith catalyst (honeycomb catalyst). A catalyst coat layer is formed on a carrier such as aluminum oxide (alumina), titanium oxide (titania), and zeolite. An occlusion material and a metal catalyst are carried in the catalyst coat layer. The occlusion material occludes NOx when the air/fuel ratio of exhaust gas is in a lean state and releases the occluded NOx when the air/fuel ratio of exhaust gas is in a rich state.

For the NOx occlusion material (NOx occlusion substance), an alkaline metal such as potassium (K), sodium (Na), lithium (Li), rubidium (Rb), cesium (Cs) and francium (Fr) is used. More amounts of NOx can be adsorbed by the occlusion material that has higher molecular weight per mole. In this case, however, since the weight is also heavier, the amount adsorbed is small per weight. Considering the balance of the amount adsorbed per mole and the amount adsorbed per weight, potassium is suitable since it has medium molecular weight compared to other alkaline metals.

As the metal catalyst, a platinum group element (including an oxide thereof) such as platinum (Pt), rhodium (Rh), palladium (Pd) and iridium (Ir) is usually used. In the present invention, however, platinum and rhodium are used and the molar ratio of platinum carried and rhodium carried is within the range of 2:1 to 1:2. In other words, the ratio of platinum and rhodium carried is set at an optimum range (area B) where the NOx purification rate is high in FIG. 3, which means that the amount of platinum carried is decreased and rhodium is carried. This composition with less amounts of platinum carried enables high NOx purification performance to be attained since the NOx purification activity of platinum is suppressed by potassium or other alkaline metal used as the occlusion material.

Figure 3:
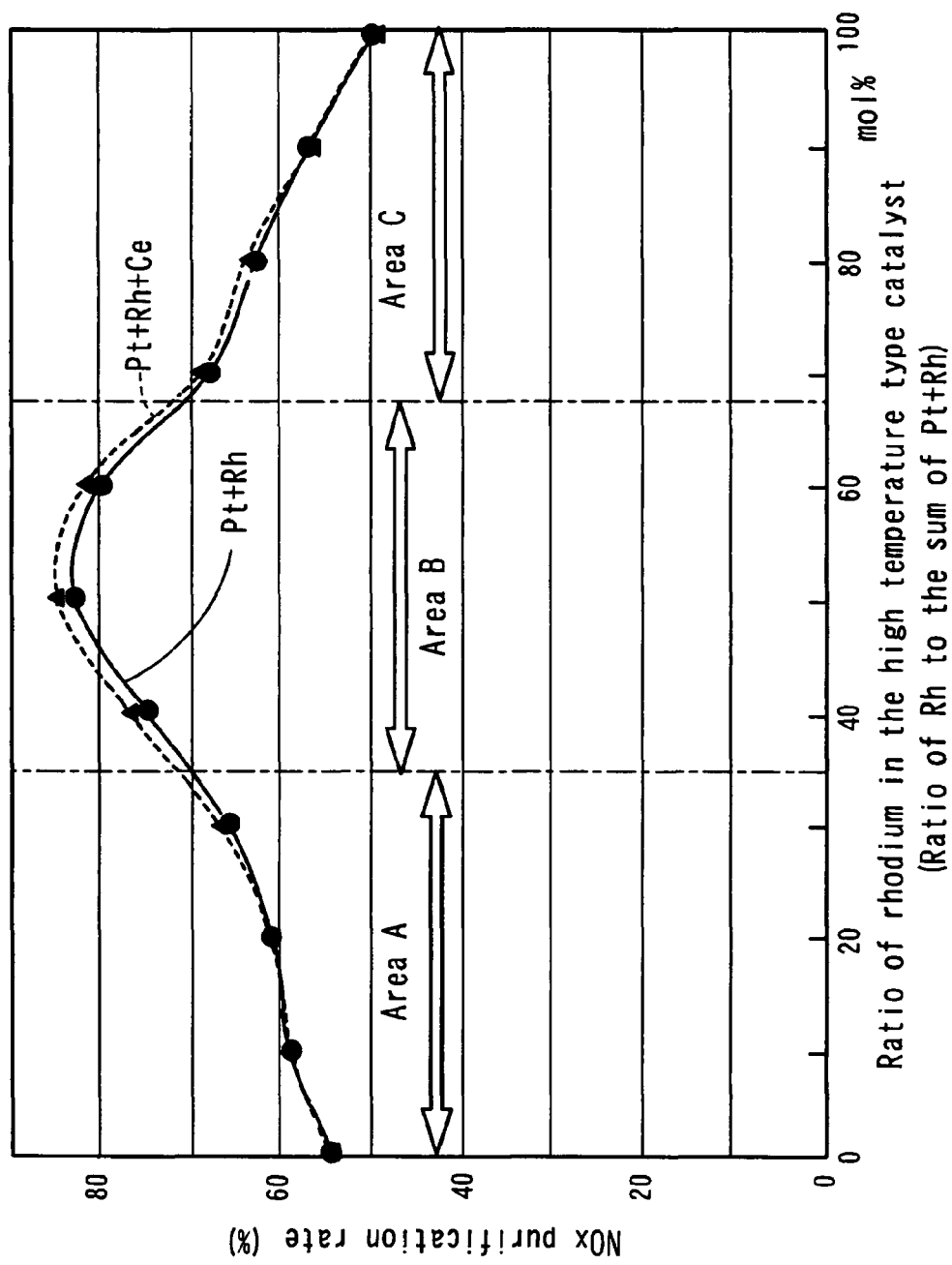
FIG. 3 shows the relation between ratios of the amount of rhodium carried in a high-temperature type catalyst to the sum of the amounts of rhodium and platinum carried thereon and NOx purification rates (%) on the basis of test results.
Figure 4:
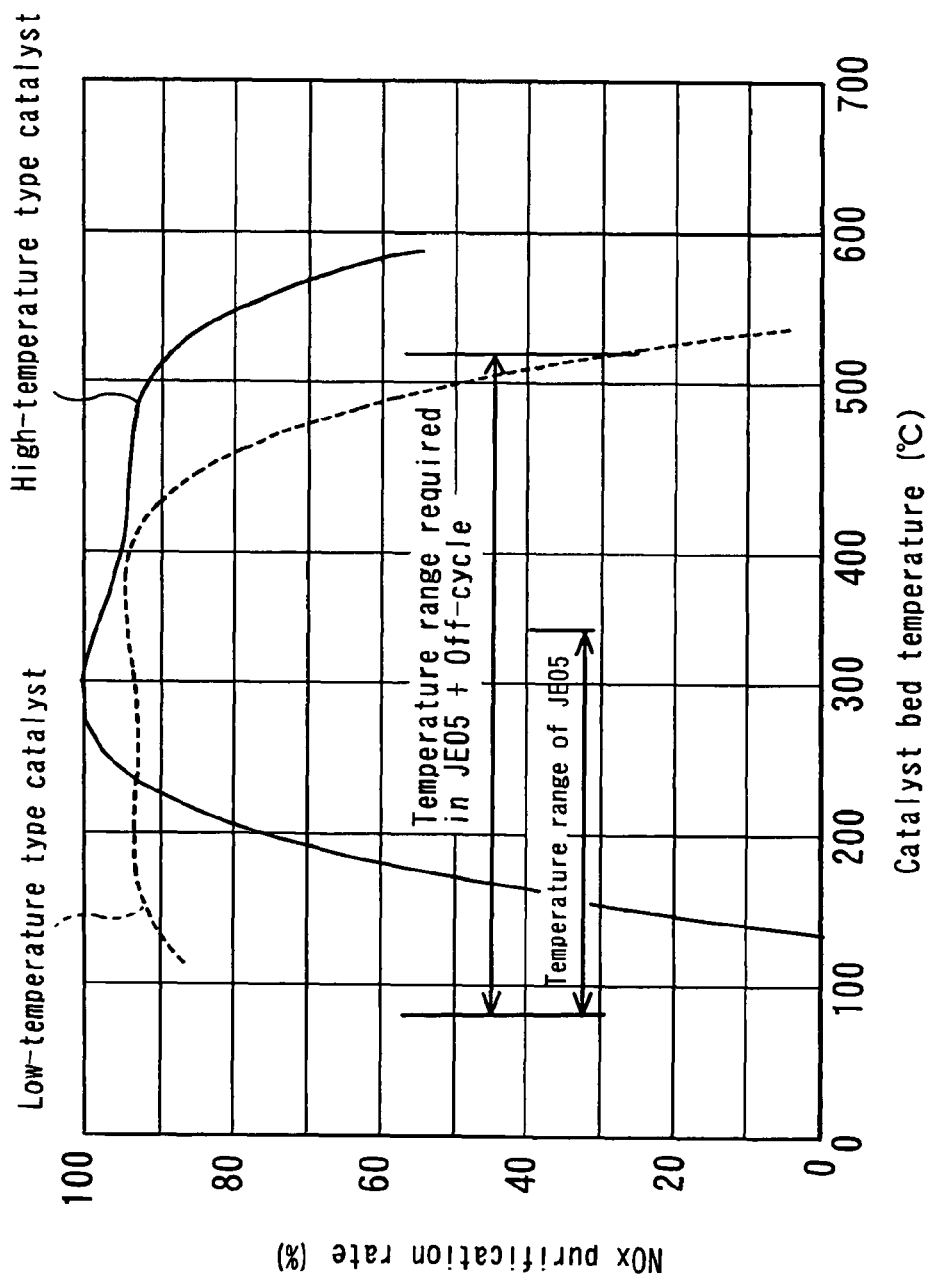
FIG. 4 shows the relation between catalyst bed temperatures and NOx purification rates in high-temperature type and low-temperature type catalysts according to a conventional art.
Figure 5:
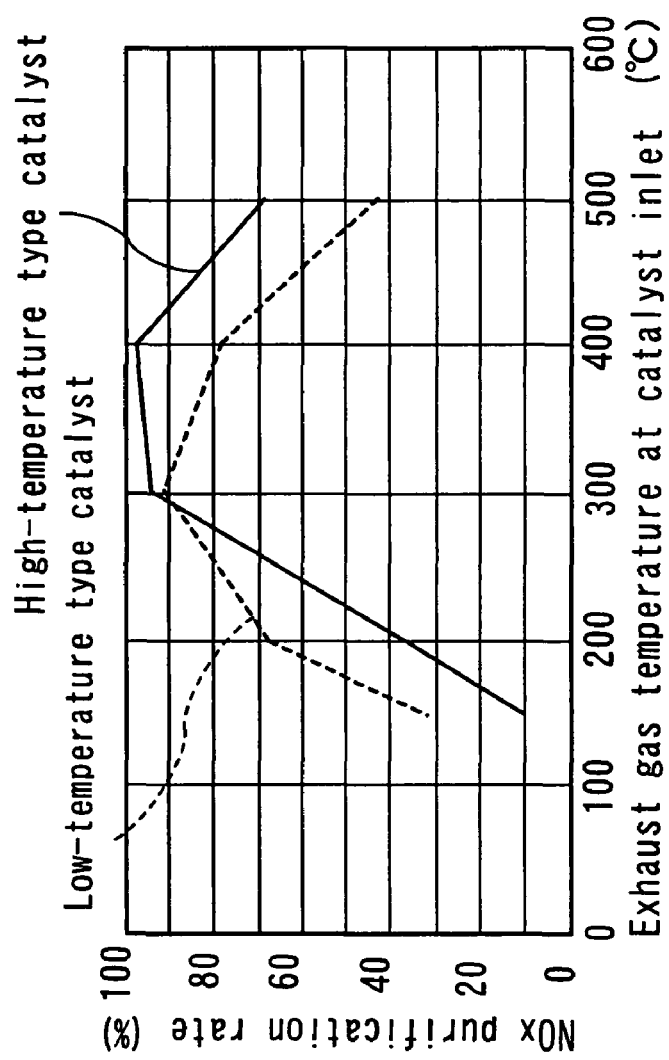
FIG. 5 shows the relation between exhaust gas temperatures at the catalyst inlet and NOx purification rates after making gas at 700 deg C. pass through the system for 100 hours in high-temperature type and low-temperature type catalysts according to a conventional art.
Figure 6:
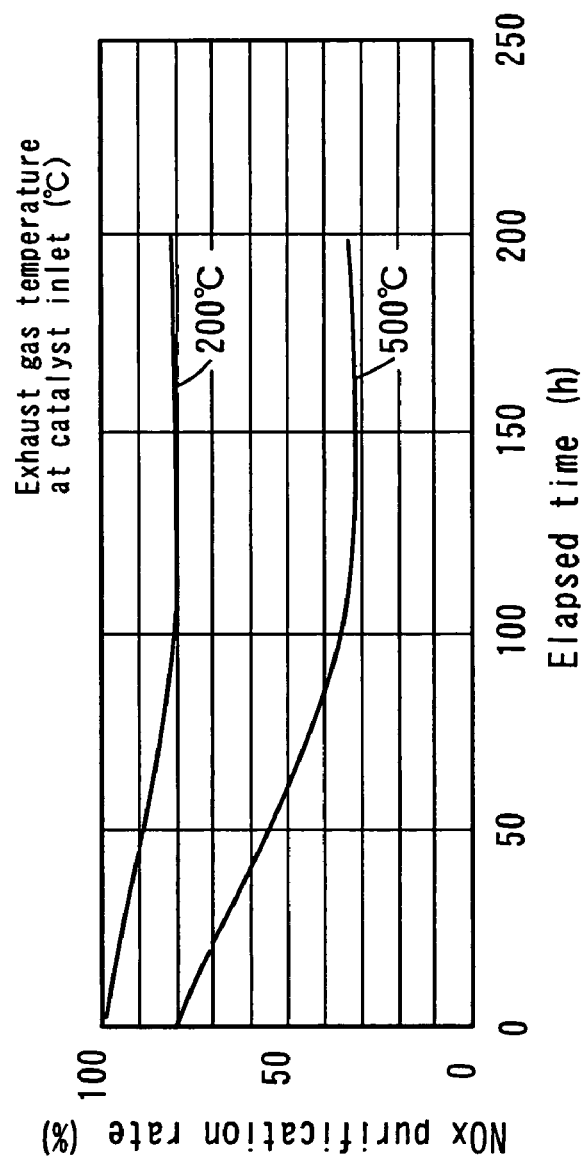
FIG. 6 shows the relation between elapsed time and NOx purification rates in a low-temperature type catalyst according to a conventional art.
Figure 7:
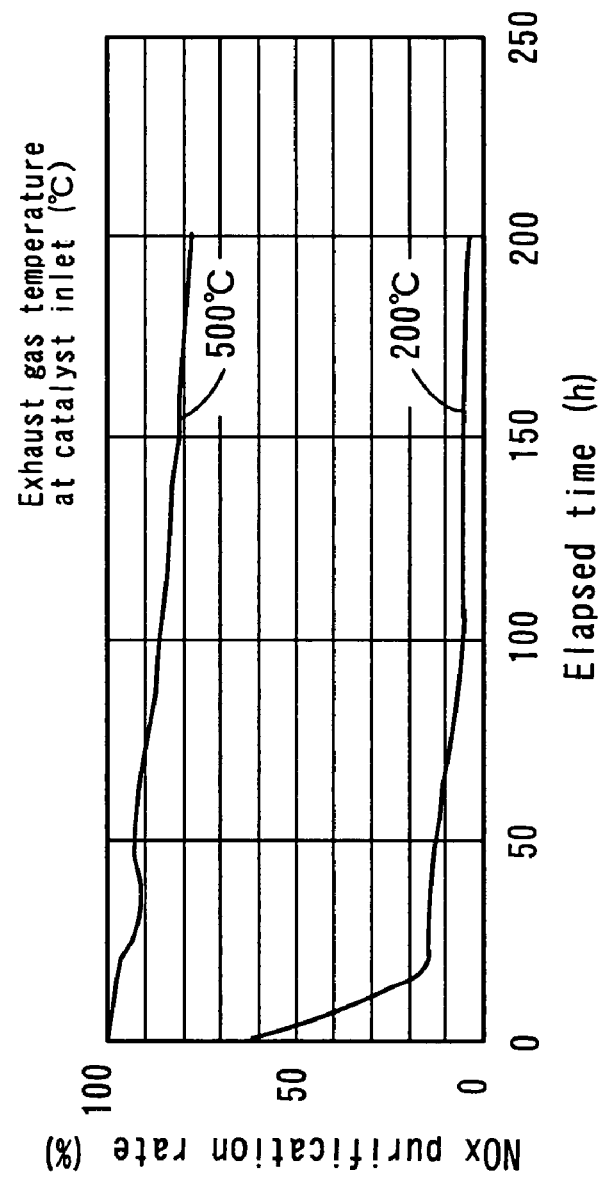
FIG. 7 shows the relation between elapsed time and NOx purification rates in a high-temperature type catalyst according to a conventional art.

FIG. 3 shows test results (exhaust gas temperature of 200 deg C.) indicating the change of NOx purification rate when the ratio of platinum and rhodium carried is changed. As seen from FIG. 3, in area A where the ratio of rhodium carried is low and the ratio of platinum carried is high, NOx purification activity is lowered due to platinum poisoning by potassium. In area C, where the ratio of rhodium carried is high and the ratio of platinum carried is low, the activity of rhodium at low temperature is low, so NOx purification activity is low if the amount of platinum is small.

Furthermore, the sum of the amounts of platinum and rhodium carried in the high-temperature type catalyst 2 is set at not less than 0.5 g/L and not more than 5.0 g/L and the amount of platinum carried thereon is set at not less than 0.1 g/L and not more than 3.0 g/L.

If the sum of the amounts of platinum and rhodium carried is less than 0.5 g/L, NOx purification activity is insufficient. If the sum is more than 5.0 g/L, the NOx purification activity effect is saturated, so it is not cost-effective. If the amount of platinum carried is less than 0.1 g/L, NOx purification activity is insufficient. If the amount of platinum is more than 3.0 g/L, it is not cost-effective.

Furthermore, cerium (Ce) is carried in the high-temperature type catalyst 2 and the amount of cerium carried is set at not less than 0.1 g/L and not more than 2.0 g/L.

The composition where cerium is carried enables oxygen to be occluded and released. Therefore, the difference of oxygen concentrations between that in a lean state, in the stoichiometric state or in a rich state is reduced, thus making it become liable to exhibit ternary activity and improving NOx purification performance. As seen from FIG. 3, the NOx purification rate is higher when cerium is carried than when cerium is not carried.

If the amount of cerium carried is less than 0.1 g/L, the oxygen occlusion and release effects are reduced. If the amount of cerium carried is more than 2.0 g/L, rich depth is prevented.

The low-temperature type catalyst 3 will now be described. The low-temperature type catalyst 3 is made of a monolith catalyst similar to that of the high-temperature type catalyst 2. A catalyst coat layer is formed on a carrier such as aluminum oxide and titanium oxide. An occlusion material and a metal catalyst are carried in the catalyst coat layer. The occlusion material occludes NOx when the air/fuel ratio of exhaust gas is in a lean state and releases the occluded NOx when the air/fuel ratio of exhaust gas is in a rich state.

For the NOx occlusion material (NOx occlusion substance), unlike that for the high-temperature type catalyst 2, it is preferable to use an alkaline earth metal whose NOx occlusion capacity is not lowered at low temperature. The alkaline earth metal includes barium (Ba), beryllium (Be), magnesium (Mg), calcium (Ca), strontium (Sr), and the like.

For the metal catalyst, a platinum group element (including an oxide thereof) can be used since NOx purification activity is not suppressed by an alkaline metal unlike that in the high-temperature type catalyst 2. The platinum group element includes platinum (Pt), rhodium (Rh), palladium (Pd), iridium (Ir) and the like.

Following the above-mentioned composition, in the high-temperature type catalyst 2, an alkaline metal is used as the occlusion material, thus increasing the activity at high temperature. In addition, the amount of platinum carried whose NOx purification activity is suppressed by the alkaline metal is decreased and rhodium is carried. By setting the ratio of platinum and rhodium carried to an optimum range, high NOx purification performance can be attained.

Furthermore, in the high-temperature type catalyst 2 in the front stage, rhodium whose oxidation activity is high accelerates the activity in reaction to the conversion from nitrogen monoxide to nitrogen dioxide, thus increasing the occlusion capacity. Rhodium whose oxidation activity is high also accelerates partial-oxidization of hydrocarbon even at very low temperature. The partial-oxide that is generated by the partial-oxidization and is an effective reducing agent significantly improves the performance of the low-temperature type catalyst 3 in the rear stage. Furthermore, the temperature elevation of exhaust gas in the high-temperature type catalyst 2 in the front stage causes the temperature elevation of the low-temperature type catalyst 3 in the rear stage, thus improving NOx purification performance.

Figure 2:
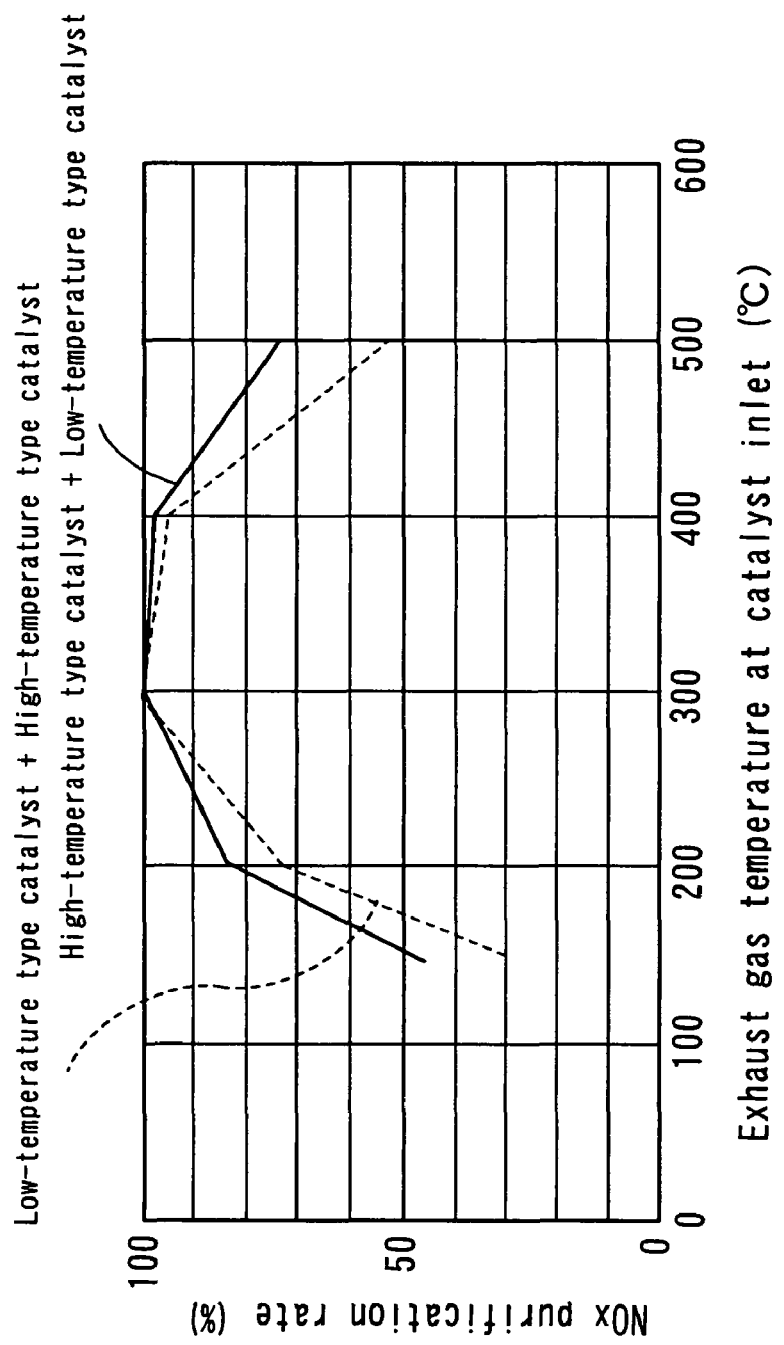
FIG. 2 shows the relation between exhaust gas temperatures at the catalyst inlet and NOx purification rates after making air at 700 deg C. pass through the system for 100 hours in a NOx purification system of an embodiment according to the present invention.

Therefore, as shown in FIG. 2, the NOx purification system (the high-temperature type catalyst 2+the low-temperature type catalyst 3) 1 according to the present invention, in which the high-temperature type catalyst 2 is disposed in the front stage and the low-temperature type catalyst 3 is disposed in the rear stage, is the system that has a wide NOx activation temperature window. Also, as seen from FIG. 2, the NOx purification rate is increased even in a low-temperature range such as at 150 deg C. To explain the reason for the improvement of NOx purification performance at low temperature, what must be considered is that the improvement of the performance of the low-temperature type catalyst 3 in the rear stage is facilitated by the following causes and the like.

The first cause is the increase of occlusion capacity by accelerating the activity in the reaction from NO to $NO_2$ at low temperature in the high-temperature type catalyst 2 in the front stage. The second cause is the improvement of reduction performance by the partial-oxidation effect of a reducing agent due to the reaction from HC to CO at low temperature in the high-temperature type catalyst 2 in the front stage. The third cause is the improvement of purification performance by the temperature elevation of the low-temperature type catalyst 3 in the rear stage due to the temperature elevation of exhaust gas in the high-temperature type catalyst 2 in the front stage.

At high temperature, exhaust gas is purified by only the function of the high-temperature type catalyst 2 in the front stage as values detected by the NOx sensor indicated after the high-temperature type catalyst 2 in the front state at the test. Therefore, the properties of the high-temperature type catalyst 2 in the front stage are particularly important.

In FIG. 2, also shown is the case where the low-temperature type catalyst is disposed in the front stage and the high-temperature type catalyst is disposed in the rear stage (the low-temperature type catalyst+the high-temperature type catalyst). However, as seen in FIG. 2, the NOx purification system of the layout according to the present invention shows higher NOx purification rates than in the case in both low and high-temperature ranges.

For the sake of reference, if the layout according to the present invention is changed in such a way that the low-temperature type catalyst is disposed in the front stage and the high-temperature type catalyst is disposed in the rear stage, the performance at both low and high temperature deteriorates. The reasons for the deterioration may be considered as follows: the advantageous effect of the low-temperature type catalyst on the upstream side is lost in a low-temperature range; a reducing agent is consumed by the low-temperature type catalyst in the front stage in a high-temperature range, thus suppressing the reduction function of the high-temperature type catalyst in the rear stage; and the temperature of exhaust gas is elevated, thus suppressing the occlusion function of the high-temperature type catalyst in the rear stage.

EXAMPLES

In NOx purification system 1 in the first example according to the present invention, in which a high-temperature type catalyst 2 in the front stage and a low-temperature type catalyst 3 in the rear stage were provided, the target purification rate (70% at 530 deg C.) was achieved. In NOx purification system 1A of example 2, in which the size of the high-temperature type catalyst 2 in the front stage was set at half of the size of that of example 1 and the size of low-temperature type catalyst 3 in the rear stage was set at the same size as that of example 1, the NOx purification rate is improved but the target purification rate (70% at 530 deg C) was not achieved. When the size of the high-temperature type catalyst 2 is not less than two-thirds of that of example 1, the same effect as that of example 1 was obtained. In a conventional system in which a conventional high-temperature type catalyst was provided in the front stage and a low-temperature type catalyst was provided in the rear stage, the NOx purification rate in a high-temperature range was insufficient.

A NOx purification system according to the present invention has excellent effects as described above, and can be very effectively utilized as the NOx purification system for exhaust gas from internal combustion engines on automobiles, as well as for exhaust gas from various industrial machines and stationary internal combustion engines, factory emissions, power plant emissions and the like.

What is claimed is:

1. An NOx purification system, comprising:
a high-temperature type NOx occlusion reduction type catalyst disposed on an upstream side of the system; and
a low-temperature type NOx occlusion reduction type catalyst is disposed on a downstream side of the system in series,
wherein the high-temperature type NOx occlusion reduction type catalyst includes potassium occlusion material, and a metal catalyst including platinum and rhodium,
wherein an amount of rhodium to a sum of amounts of the platinum and rhodium is within a range of ⅓ and ⅔, and ⅓ is a value corresponding to NOx purification activity being reduced because of platinum poisoning by potassium, and
wherein a molar ratio of the platinum to the rhodium is within a range of 2:1 to 1:2.

2. The system according to claim 1,
wherein a sum of an amount of the platinum and of the rhodium is not less than 0.5 g/L and not more than 5.0 g/L, and
wherein the amount of the platinum is not less than 0.1 g/L and not more than 3.0 g/L.

3. The system according to claim 2, wherein the high-temperature type NOx occlusion reduction type catalyst further includes cerium.

4. The system according to claim 3, wherein the cerium is in an amount of not less than 0.1 g/L and not more than 2.0 g/L.

5. The system according to claim 1, wherein the high-temperature type NOx occlusion reduction type catalyst further includes cerium.

6. The system according to claim 5, wherein the cerium is in an amount of not less than 0.1 g/L and not more than 2.0 g/L.

7. The system according to claim 1, wherein the catalysts abut each other.

8. The system according to claim 1, wherein the catalysts are spaced from each other.

9. The system according to claim 1, wherein the low-temperature type NOx occlusion reduction type catalyst includes an occlusion material including an alkaline-earth metal, and a metal catalyst selected from a platinum group element.

10. The system according to claim 9, wherein the alkaline-earth metal is selected from the group including barium, beryllium, magnesium, calcium and strontium.

11. The system according to claim 1, wherein a size of the high-temperature type NOx occlusion reduction type catalyst is at least two-thirds a size of the low-temperature type NOx occlusion reduction type catalyst.

12. An NOx purification system, comprising:
a high-temperature type NOx occlusion reduction type catalyst disposed on an upstream side of the system; and
a low-temperature type NOx occlusion reduction type catalyst is disposed on a downstream side of the system in series,
wherein the high-temperature type NOx occlusion reduction type catalyst includes an occlusion material including an alkali metal, and a metal catalyst including platinum and rhodium,
wherein the molar ratio of the platinum to the rhodium is within a range of 2:1 to 1:2, and
wherein a size of the high-temperature type NOx occlusion reduction type catalyst is at least two-thirds a size of the low-temperature type NOx occlusion reduction type catalyst.

13. The system according to claim 12,
wherein a sum of an amount of the platinum and of the rhodium is not less than 0.5 g/L and not more than 5.0 g/L, and
wherein the amount of the platinum is not less than 0.1 g/L and not more than 3.0 g/L.

14. The system according to claim 13, wherein the alkali metal is potassium.

15. The system according to claim 13, wherein the high-temperature type NOx occlusion reduction type catalyst further includes cerium.

16. The system according to claim 15, wherein the cerium is in an amount of not less than 0.1 g/L and not more than 2.0 g/L.

17. The system according to claim 12, wherein the alkali metal is potassium.

18. The system according to claim 12, wherein the high-temperature type NOx occlusion reduction type catalyst further includes cerium.

19. The system according to claim 18, wherein the cerium is in an amount of not less than 0.1 g/L and not more than 2.0 g/L.

20. The system according to claim 12, wherein the catalysts abut each other.

21. The system according to claim 12, wherein the catalysts are spaced from each other.

22. The system according to claim 12, wherein the alkali metal is selected from the group including potassium, sodium, lithium, rubidium, cesium and francium.

23. The system according to claim 12, wherein the low-temperature type NOx occlusion reduction type catalyst includes an occlusion material including an alkaline-earth metal, and a metal catalyst selected from a platinum group element.

24. The system according to claim 23, wherein the alkaline-earth metal is selected from the group including barium, beryllium, magnesium, calcium and strontium.

* * * * *